April 3, 1928.   1,664,688
L. H. KAUPKE
WINDROW HAY LOADER
Filed Jan. 4, 1923   4 Sheets-Sheet 1
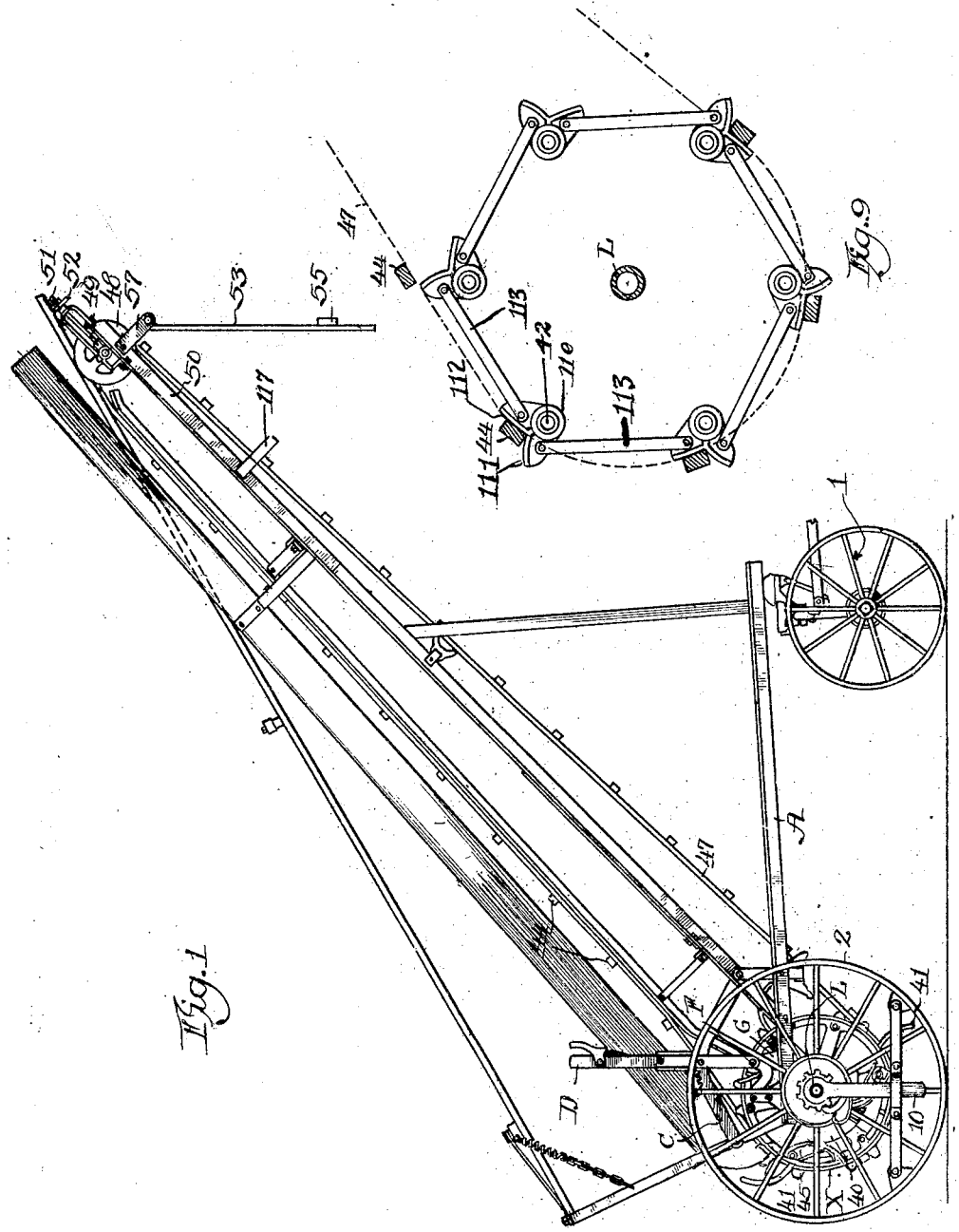

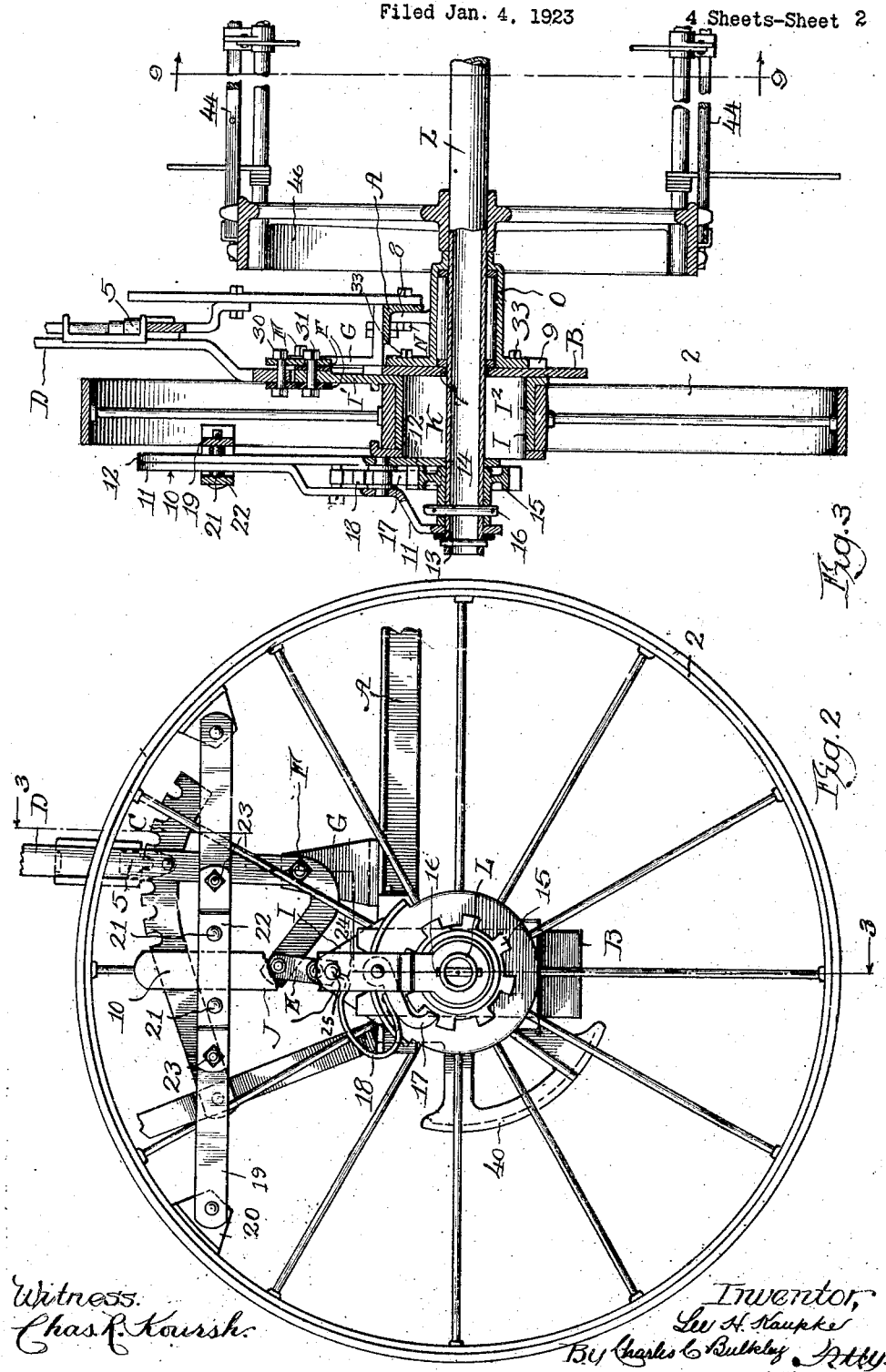

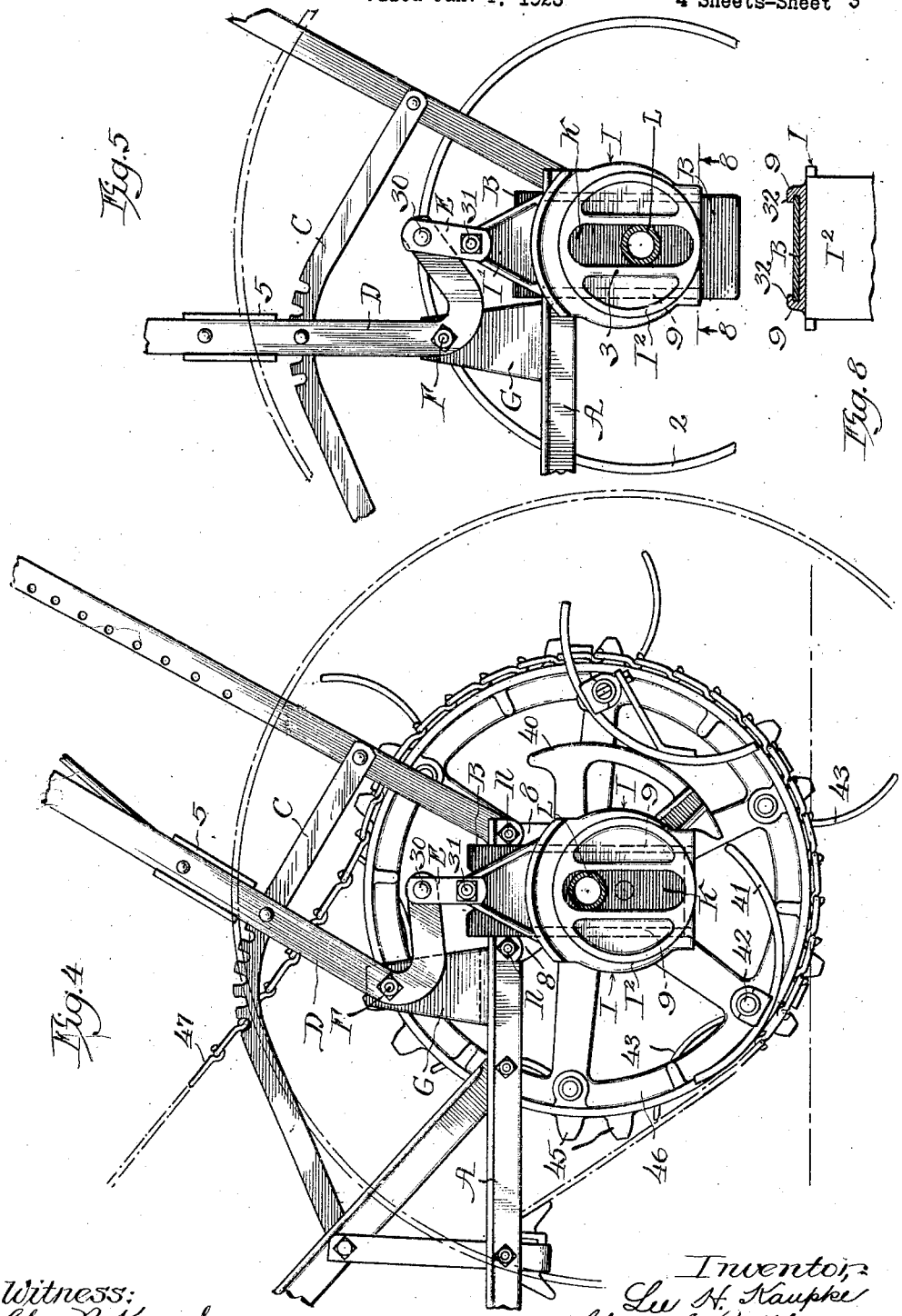

April 3, 1928.  1,664,688
L. H. KAUPKE
WINDROW HAY LOADER
Filed Jan. 4, 1923  4 Sheets-Sheet 4
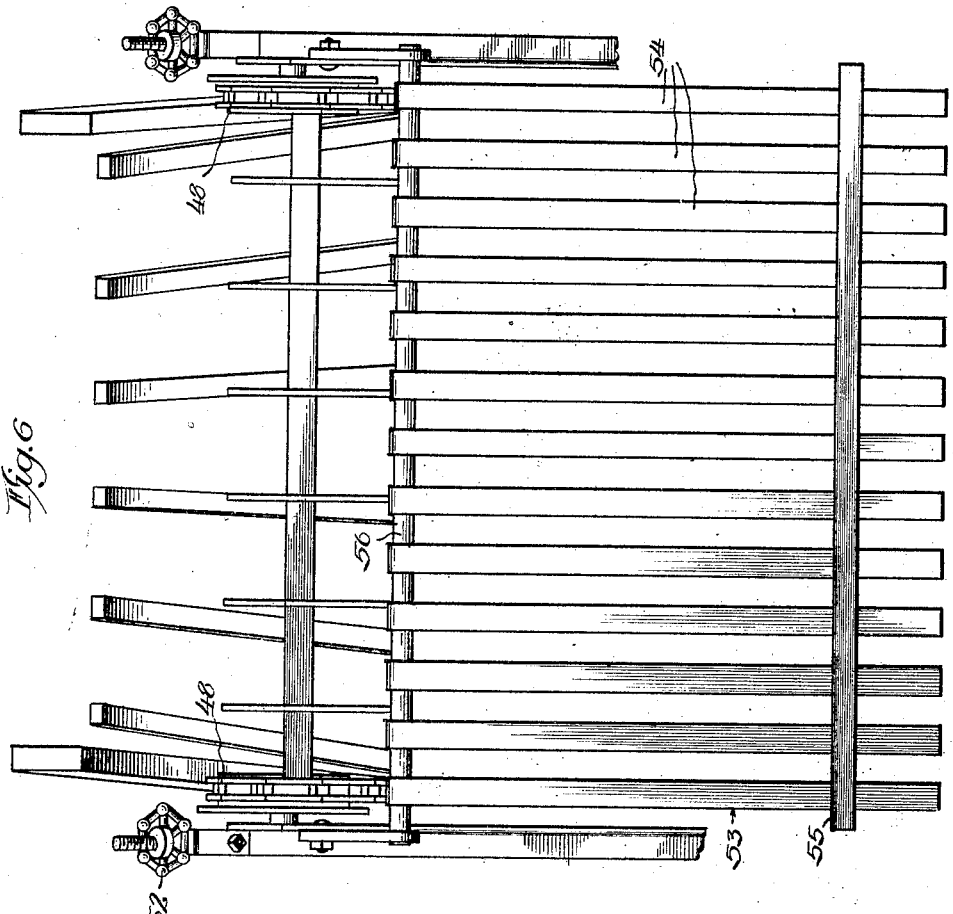
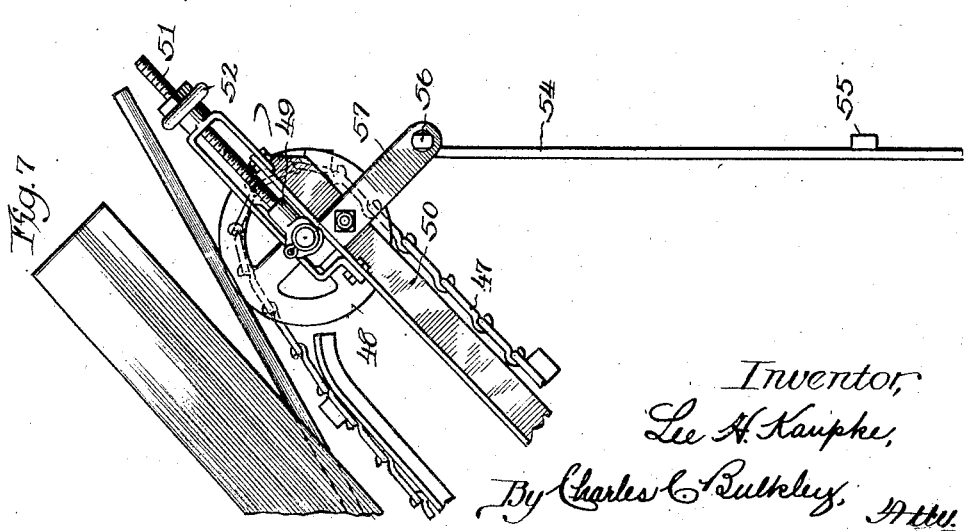
Inventor,
Lee H. Kaupke,
By Charles C. Bulkley, Atty.

Patented Apr. 3, 1928.

1,664,688

UNITED STATES PATENT OFFICE.

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS.

WINDROW HAY LOADER.

Application filed January 4, 1923. Serial No. 610,639.

My invention consists in certain improvements in the construction and operation of windrow hay loaders. My improvements relate more particularly to the means for adjusting the elevation of the rotary rake, affording support to the rake bars and web slats of the conveyor intermediate their ends in order to strengthen and to some extent at the same time lighten the structure, and the provision of a wind-board at the upper end of the elevator.

My improvements also include the use of a shaft for the rotary rake which performs no function as the axle of the implement, the wheels of the implement being carried upon bearings which are entirely independent of the rotary rake shaft and have no relation thereto other than in the provision of means whereby the rotation of the wheels upon which the implement is mounted is communicated to the rotary rake shaft. In my improved hay-loader the axles upon which the drive-wheels are mounted take the form of separate stub axles on opposite sides of the implement. These axles support the implement, thus, as above stated, relieving the rake shaft of all weight. The rake shaft thus merely receives rotation from the drive-wheels which rotation actuates the rake and elevator. The bars upon which the rake teeth are mounted are supported intermediate their ends by a hexagonal frame, there being six of the rake bars in the implement illustrated. Loosely mounted upon each of the rake bars, near its center, is a projecting member adapted to come up against and support the passing web-slat of the conveyor.

In the drawings—

Figure 1 is a side elevation of my improved hay-loader in its entirety;

Fig. 2 is an elevation of one of the rear or drive wheels with the associated mechanism;

Fig. 3 is a vertical central view transversely of the drive-wheel and mechanism taken on line 3—3 of Fig. 2;

Fig. 4 is an end view of the rake cylinder, drive wheel bearing, and means for raising and lowering the frame and rake shaft relative to the drive-wheels, the means for communicating rotation from the drive-wheel to the rake shaft being omitted in order to better exhibit the parts shown. In this view the frame and rake cylinder are shown as elevated almost to their extreme limit relative to the drive-wheel and ground.

Fig. 5 is a view of the raising and lowering mechanism, showing the frame and rake shaft in a lower position than shown in Fig. 4;

Fig. 6 is an end view of the upper end of the elevator, the view being taken from the right of the structure as shown in Fig. 1;

Fig. 7 is a detail view in side elevation of the upper end of the elevator showing the means for adjusting the tension of the endless conveyor;

Fig. 8 is a section on the line 8—8 of Fig. 5 through a part of the drive-wheel bearing which serves as a guide and the co-operating member of the frame of the machine which is adapted to move vertically in the guide so formed; and Fig. 9 is a transverse sectional view showing the relation of the conveyor slats to the rake cylinder.

As shown in Fig. 1, my improved hay-loader is of a type now in general use in so far as it consists of a frame A carried at the front by truck wheels 1 and at the rear by drive wheels 2, so-called because they drive the rake cylinders, and through the rake cylinders drive the endless conveyor which passes around the rake cylinders and around idler wheels at the top of the elevator. The shaft of the rake cylinder, designated by the letter "L", is rotatably mounted in fixed relation to the frame A, and the frame A is mounted upon and vertically adjustable with respect to the drive wheel 2, which adjustable mounting provides means for lowering and raising the rake cylinder relative to the ground. This part of the construction is shown most clearly in Figs. 2, 3, 4 and 5. The frame A of the machine is mounted upon and connected to the bearings of the drive-wheels 2 through a lever D and link E. The lever D is pivoted at F to a pedestal G fixed to the frame A, and the short arm of the lever D is pivoted at 30 to the upper end of link E, the lower end of link E being pivoted at 31 to the upper part I' of a wheel bearing member which is designated generally by the letter "I". The wheel bearing members I—there being one at each side of the machine—are in effect separate stub axles, there being no continuous vehicle axle extending across the machine from side to side. These stub axles I shall refer to, for convenience, as wheel bearings or wheel bearing members.

The wheel bearings I being supported by the wheels 2 are at a fixed elevation from the ground. Each of the wheel bearing members I comprises a cylindrical section designated as $I^2$ upon which the drive-wheel 2 is journaled and an upwardly projecting part. Upon their inner sides the bearing members I are formed with opposed flanges 9 having overhanging edge portions 32 which form a guide-way to receive the vertically adjustable plate B, which plate B is rigid with and in effect a part of the frame A. As shown in Fig. 3, the side rail of the frame A is a longitudinal angle iron. Rigidly fixed to the frame A by means of bolts N is the rake-shaft-bearing member O which is provided with upwardly projecting ears 8 through which the bolts N pass, thus connecting the rake shaft bearing member O rigidly with the frame A of the machine, as above stated. Plate B, above mentioned, is fixedly and rigidly attached to the rake shaft bearing member O by any suitable means, bolts 33 being shown for that purpose in Fig. 3. The rake shaft L has its bearings on rollers mounted in bearing member O.

From the foregoing it will be apparent that plate B and member O are rigid with and in effect a part of the frame A, and that as the frame A is raised and lowered plate B will slide vertically upward and downward in the guide formed by the flanges 9 which are formed upon and are a part of the wheel bearing member I. A notched segment C fixedly mounted upon the frame of the machine coacts with a latch 5 mounted upon the lever D for the purpose of holding the frame of the machine in adjusted position. It will be apparent that in the vertical adjustment of the frame and with it the rake shaft, the pivotal point 31 at the top I' of the bearing member I is a fixed point relative to the ground and to the wheel 2. The lever D has its fulcrum at the upper end 30 of link E and supports the rear end of the frame through its pivotal connection therewith at F. When the lever is moved, the frame will move vertically relative to the wheel and ground, and during this movement the rake shaft bearing O and with it the rake shaft L will have a similar vertical movement, during which movement the plate B which, as above stated, is rigidly secured to the rake shaft bearing O, will also have a vertical movement in the guide formed by the flanges 9 upon the wheel bearing member I.

I have shown the wheel-bearing member I provided with a central vertical slot K through which the rake shaft L projects and in which it is free to move vertically. While I have shown rake shaft L as projecting through slot K in the wheel-bearing member I, this particular arrangement of the parts is adopted merely for compactness and convenience in arranging the transmission mechanism whereby the rotary movement of the drive-wheel 2 is imparted to the rake shaft L. By suitable modification of the means for transmitting rotation from the drive-wheel 2 to the rake shaft L, the latter might be located forward or to the rear of the drive-wheel or its hub and the bearing member I. The drive shaft L does not in any way serve as an axle for the hay-loader and its only function is as a carrier and an impeller for the rotary rake and the lower end of the conveyor.

The means for transmitting the rotation of the drive-wheels 2 to the rake cylinder shaft is most completely shown in Figs. 2 and 3. By reason of the fact that the rake and conveyor shaft L is carried by and occupies a fixed relation to the frame A while the position of the frame relative to the stub axles I and wheels 2 is varied from time to time, it is necessary to provide a driving connection between the wheels and shaft that will be operative in the different relative positions assumed by the shaft and wheels. Generally stated, each of these drive connections, there preferably being one for each wheel, consists of a radial drive-arm J loosely pivoted on shaft L just outside of the wheel 2 and carrying a pawl adapted to engage a toothed wheel rigidly fixed to the shaft. Near its rim the wheel carries two studs, which preferably are provided with rotary sleeves or rollers between which the drive-arm passes, the rotary movement of the wheel being communicated to the drive-arm but leaving the drive-arm free to move endwise between the roller studs as the frame A and with it shaft L are adjusted to different elevations relative to the wheel and ground. As shown in Figure 3, the drive-arm J consists of an outer section 11 and an inner section 12, which at their outer ends lie in contact and are secured together. At their inner ends the parts 11 and 12 of the arm 10 are spaced apart and separately journaled at 13 and 14 on shaft L, receiving between them the toothed wheel 15, which is secured to shaft L by a pin 16. Pivoted between the parts 11, 12, of the arm 10 is a pawl 17, and a spring 18 secured to pawl 17 is adapted either to hold the pawl 17 in engagement with toothed wheel 15 or to permit its withdrawal therefrom. A bar 19 is fixed at its ends to angles 20 secured to the inner face of the rim of wheel 2. Studs 21, preferably carrying rollers, are fixed at their inner ends in bar 19 and at their outer ends in a plate 22, the central part of which is spaced from bar 19 and its ends in contact with and secured to bar 19 at 23, 23, the drive-arm 10 being received in the opening formed by the bar 19, plate 22 and roller studs 21. Provision is thus made for transmitting the rotative movement of the wheel to the drive-arm and, through the pawl 17 and toothed wheel 15, to shaft L without interfering with vertical adjustment of the frame A and shaft L relative to the wheel. The only effect of such adjustment upon the transmission of rotation from the wheel to the drive-arm is to cause a variation in the position lengthwise of the drive-arm at which it receives the rotative impulse from the wheel. The spring 18 may be riveted to the pawl 17 and may be provided with a sharp bend 24 adapted when arranged by manual means below the stud 25 to hold the pawl in engagement with toothed wheel 15 and when above the stud to hold the pawl out of engagement with the wheel 15.

The means for advancing the rake teeth to operative position and withdrawing them as the hay is delivered to the elevator may be of the usual type. In the drawings, particularly in Figures 2 and 4, I have shown this mechanism in some detail. The stationary cam 40 is so positioned as to trip the rocker arms 41 which are fixed to the rake bars 42, thereby advancing the rake teeth 43 from the withdrawn position shown at the left of Figure 4 to the advanced position shown at the right. The web conveyor may be of the usual form comprising cross slats 44 so spaced as to be received between and receive movement from pairs of teeth 45 spaced at intervals about the peripheries of the end members 46 of the rake cylinders. The end members 46 of the cylinders are, of course, fixed to the rake shaft L and are shown of open structure comprising spokes connected at their outer ends by a circular rim, upon the exterior of which rim are formed the elevator actuating teeth 45 above mentioned. The cross slats of the elevator belt are connected at their ends by chains 47 which at their upper ends pass over supporting idler wheels 48, these idler wheels being mounted in journals 49 which in turn are adjustably mounted upon the lower side bars 50 of the elevator frame. The tension of the elevator web may be adjusted by the screws 51 and co-acting hand nuts 52 shown for that purpose. At the upper end of the elevator, I provide a depending wind-board 53. This wind-board consists of a series of spaced vertical slats 54 connected by a lower cross member 55 and an upper cross member 56. The wind-board is pivotally suspended at its upper end in arms 57 which are fixed to and project downwardly from the lower side bars 50 adjacent their upper ends. This pivotal connection may be formed by receiving the ends of the cross member 56 in apertures at the lower ends of the projecting members 57. Stops 117 are provided to limit the inward movement of the wind-board thus keeping it from assuming a position when it would interfere with the conveyor.

For the purpose of supporting the central part of the conveyor slats 44, I provide supporting members 110, one of which is pivotally mounted on each of the rake bars 42 about midway of its length. The form of the supporting members is best shown in Figure 9. Each supporting member extends outwardly from the rake bar and is provided on its outer face with diverging faces 111 and 112 designed respectively to support the co-acting slat circumferentially and radially of the rake cylinder. The members 110 are connected by links 113 which have pivotal connection therewith and serve to hold them in proper relation to the slats.

What I claim as my invention is:

1. In an apparatus of the class described, a frame having a rotatable rake member thereon, a drive shaft for said rake carried by said frame, a wheel axle at one side of said frame, guide means carried by said frame and in supporting engagement with said wheel axle for positively moving the latter vertically relative to said frame, a supporting wheel having bearing on said axle, and means affording a drive connection between said wheel and said drive shaft.

2. In an apparatus of the class described, a wheel bearing, a frame having vertically disposed guide means coacting with said wheel bearing means for adjusting said bearing along said guide means, a rake shaft mounted on said frame independently of said wheel bearing, a wheel mounted on said bearing, and means for transmitting rotation from said wheel to said shaft.

3. In an apparatus of the class described, a wheel bearing comprising an axle member, a frame-supporting member and a vertically disposed frame-guiding member, a frame adjustably supported on said supporting-member and engaging said guiding-member, a rake shaft mounted on said frame independently of said wheel bearing, a wheel mounted on said bearing, and means for transmitting the rotation from said wheel to said shaft.

4. In an apparatus of the class described, a wheel bearing, a frame, a lever pivotally mounted on said frame, a link pivotally connected to said lever and wheel bearing, a rake shaft having bearing on said frame independently of said wheel bearing, a wheel mounted on said bearing, and means for transmitting rotation from said wheel to said shaft.

5. In an apparatus of the class described, a wheel bearing, a frame, a lever pivotally mounted on said frame, a link pivotally connected to said lever and wheel-bearing, coacting guides upon said wheel bearing and frame, a rake shaft mounted on said frame independently of said wheel-bearing, a wheel mounted on said bearing, and means for transmitting rotation from said wheel to said shaft.

6. In an apparatus of the class described, a wheel bearing, a frame adjustably supported on and slidably engaging said wheel bearing, said wheel bearing having a slot extending therethrough, a rake shaft mounted on said frame and projecting through said slot, a wheel mounted on said bearing, and means for transmitting rotation from said wheel to said shaft.

7. In an apparatus of the class described, a wheel bearing comprising an axle member, a frame-supporting member and a frame-guiding member, a frame adjustably supported on said supporting member and engaging said guiding member, said wheel bearing having a slot extending therethrough, a rake shaft mounted on said frame and projecting through said slot, a wheel mounted on said bearing, and means for transmitting rotation from said wheel to said shaft.

8. In an apparatus of the class described, a wheel bearing, a frame, a lever pivotally mounted on said frame, a link pivotally connected to said lever and wheel bearing, said wheel bearing having a slot extending therethrough, a rake shaft mounted on said frame and projecting through said slot, a wheel mounted on said bearing, and means for transmitting rotation from said wheel to said shaft.

9. In an apparatus of the class described, a wheel bearing, a frame, a lever pivotally mounted on said frame, a link pivotally connected to said lever and wheel bearing, coacting guides upon said wheel bearing and frame, said wheel bearing having a slot extending therethrough, a rake shaft mounted on said frame and projecting through said slot, a wheel mounted on said bearing, and means for transmitting rotation from said wheel to said shaft.

10. In an apparatus of the class described, a frame, separate axles upon opposite sides of said frame, said frame being mounted upon said axles and vertically adjustable with relation thereto, a rake shaft mounted on said frame and extending through slots in said axles, wheels mounted on said axles, and means for transmitting rotation from said wheels to said shaft.

11. In an apparatus of the class described, a frame, separate axles upon opposite sides of said frame, said frame being mounted on said axles and having an independent vertical rectilinear adjustment with relation thereto, a rake shaft mounted on said frame and extending through slots in said axles, wheels mounted on said axles, and means for transmitting rotation from said wheels to said shaft.

12. In a hay-loader, a rotary rake comprising end members and rake bars connecting said end members, a conveyor comprising flexibly connected cross-slats, said conveyor extending around said rotary rake, and pivoted supporting members mounted on said rake bars intermediate and substantially spaced from their ends and adapted to support said slats during their passage around said rotary rake.

13. In a hay-loader, a rotary rake comprising end members and rake bars connecting said end members, a conveyor comprising flexibly connected cross-slats, said conveyor extending around said rotary rake, supporting members pivotally mounted on said rake bars intermediate and substantially spaced from their ends and adapted to support said slats during their passage around said rotary rake, and links connecting said supporting members.

14. In an apparatus of the class described, a wheel bearing, a frame having vertically disposed guide means coacting with said wheel bearing, and adjustable frame-supporting means interposed between said frame and said wheel bearing.

Signed by me at Rock Island, Illinois, this 29th day of December, 1922.

LEE H. KAUPKE.